United States Patent

[11] 3,621,273

[72] Inventors Robert J. Rorden
Los Altos;
Mark W. Dowley, Palo Alto; Wayne S. Mefferd, Palo Alto, all of Calif.
[21] Appl. No. 16,698
[22] Filed Mar. 5, 1970
[45] Patented Nov. 16, 1971
[73] Assignee Coherent Radiation
Palo Alto, Calif.

[54] OPTICAL SECOND HARMONIC GENERATOR
19 Claims, 5 Drawing Figs.
[52] U.S. Cl. ..................................................... 307/88.3,
321/69 R
[51] Int. Cl. .................................................. H02m 5/02
[50] Field of Search ........................................... 321/69;
307/88.3

*Primary Examiner*—Roy Lake
*Assistant Examiner*—Darwin R. Hostetter
*Attorney*—Limbach, Limbach & Sutton ABSTRACT: A device for providing an optical second harmonic output beam of coherent radiation such as light in response to an input beam of coherent radiation at the fundamental wavelength. A nonlinear crystal is provided within a vacuum sealed enclosure. The input light beam is provided through a first window forming an integral part of the enclosure and which is maintained at Brewster's angle to the incoming beam. A second window orthogonally oriented relative to the first window is provided for maximizing the resulting second harmonic wavelength output beam which is polarized 90° relative to the fundamental beam. Means are also provided for automatically maintaining the crystal at a predetermined temperature. During operation, the enclosure is evacuated of substantially all air, including water vapor.

• FUNDAMENTAL BEAM POLARIZATION
↕ SECOND HARMONIC BEAM POLARIZATION

• FUNDAMENTAL BEAM POLARIZATION
↕ SECOND HARMONIC BEAM POLARIZATION

INVENTORS
MARK W. DOWLEY
ROBERT J. RORDEN
WAYNE S. MEFFERD

BY Limbach, Limbach and Sutton

ATTORNEYS

INVENTORS
MARK W. DOWLEY
ROBERT J. RORDEN
WAYNE S. MEFFERD

BY Limbach, Limbach and Sutton

ATTORNEYS

OPTICAL SECOND HARMONIC GENERATOR

BACKGROUND OF THE INVENTION

The present invention relates to an optical second harmonic generator, and more particularly to an improved second harmonic optical generator for providing coherent radiation in regions of the spectrum not otherwise obtainable by existing lasers.

There are certain areas of the spectrum where it would be desirable to provide coherent radiation but which is not obtainable with existing lasers. One of these areas is the ultraviolet region of the spectrum. Potential uses for continuous wave ultraviolet laser source include use as a pump for excited state spectroscopy of many simple organic molecules and as a source for Brillouin and Raman scattering experiments where, due to the dependence of scattering efficiency on frequency to the fourth power, a factor of 16 in sensitivity is picked up. Also, parametric fluorescence studies could be extended and such a source could, of course, serve as a pump for a parametric oscillator covering the entire visible spectrum. The photochemistry of biological molecules would also benefit from the availability of a controllable ultraviolet source. Some of the photorecording materials are very sensitive in the ultraviolet region, in which case use of an ultraviolet laser beam would result in greater writing speed.

Since the first report by P. A. Franken, A. E. Hill, C. W. Peters, and B. W. Weinreich, in their article entitled "Generation of Optical Harmonics," *Phys. Rev. Letters*, Vol. 7, pp. 118–119, 1961, a good deal of research has been done regarding the subject of optical second harmonic generation.

Stated generally, the phenomena which was first noted by Franken et al. was the production of optical radiation at second harmonic wavelengths when light from a laser at the fundamental wavelength is directed to particular crystals. For example, if the output beam from an argon ion laser at 5145 A is directed through crystals of either $NH_4H_2PO_4$(ADP) or $KH_2PO_4$(KDP), and if certain conditions are met, an output beam of optical radiation will be produced at the second harmonic of the argon ion fundamental frequency, i.e., at a wavelength of 2573 A.

Thus while the general principles of optical second harmonic generation are well known, the practical problems involved with optimizing the conversion from the fundamental to the harmonic wavelengths has limited optical second harmonic generation to a status of being basically a mere laboratory curiosity.

In order to best illustrate the means by which scientists have attempted to optimize the efficiency of such second harmonic generators, certain theoretical considerations must be considered. Thus it has been shown by A. Yariv, *Quantum Electronics*, New York, Wiley, 1967, p. 351 that for a second harmonic generation, where the crystal length is much less than the confocal parameter that describes the focus beam in the crystal, the second harmonic power, $P_{2\omega}$ is given by $$P_{2\omega} = 2\left(\frac{\mu_0}{\epsilon\epsilon_0}\right)^{3/2} \frac{\omega^2 d^2 l^2}{\pi W_0^2} P\omega^2 \sin^2\theta \frac{\sin^2\left(\frac{\Delta k l}{2}\right)}{\left(\frac{\Delta k l}{2}\right)^2}$$

where:
$\epsilon_0$ = permittivity of free space = $8.854 \times 10^{-12}$ farad/meter.
$\epsilon$ = permittivity of the crystal.
$\mu_0$ = permeability of free space = $4\pi \times 10^{-7}$ henry/meter.
$\omega$ = frequency of the fundamental radiation, in radians/sec.
$d$ = nonlinear polarization constant of the crystal.
$l$ = length of the crystal.
$\theta$ = angle between the crystal optic axis and the fundamental beam.
$P\omega$ = power of fundamental beam.
$\pi W_0^2$ = cross-sectional area of the fundamental beam in the crystal.
$\Delta k$ = phase mismatch between fundamental and second harmonic beams.

The above relationship implies that there is zero absorption in the crystal at either the fundamental or second harmonic frequencies.

From the above relationships it can be seen that in order to optimize the power of the second harmonic beam, $P_{2\omega}$, phase matching is required, i.e., $\Delta k$ must be equal to or nearly equal to 0 and $\theta$ equal or nearly equal to 90°. For further information see for example the article by M. W. Dowley and E. B. Hodges, in the IEEE Journal of Quantum Electronics, Volume QE–4, No. 10 p. 552, 1968 and also see the article by M. W. Dowley, one of the present coinventors, *Applied Phys. Letters*, Volume 13, No. 11 Dec. 1, 1968, pp. 395–397.

As described generally in the above-mentioned references, the phase matching requirement results from the necessity to conserve energy and momentum in the conversion of fundamental power to second harmonic power. In particular:

2. $f_1 + f_1 = f_2$
3. $k_1 + k_1 = k_2$, where $f_1$ is the frequency of the fundamental beam, $f_2$ the frequency of the second harmonic beam, and $k_1$ and $k_2$ the wave vectors of the fundamental and second harmonic beams respectively. Since $K=(2\pi n/\lambda)$ where $n$ is the index of refraction of the crystal in which the conversion occurs and $\lambda$ the wavelength of the radiation, equation (3) implied that $n_1$ is equal to $n_2$, that is, the index of the fundamental beam is equal to that of the second harmonic. Because of normal dispersion in which the index increases with frequency, it is normally impossible to achieve this condition. In certain birefringent materials, $n_1$ may equal $n_2$ provided one beam, normally the higher frequency beam, propagates as an extraordinary wave while the lower frequency beam propagates as an ordinary wave.

In general such index matching (or phase matching) i.e., where $\theta k$ is equal to 0, and $\Delta$ is equal to 90°, occurs in some specific direction through the crystal; the specific direction being dependent on the crystal, the wavelengths involved, and the temperature of the crystal.

When these conditions occur the beams interact over the whole length of their paths through the crystal. If propagation, on the other hand, is at some angle other than 90° to the optic axis of the crystal, than due to the crystal birefringence, the beams will propagate in slightly different directions and deviate from each other. In this case there is only a limited path length in the crystal over which interaction occurs and a loss of efficiency results.

In addition to the phase matching, inspection of equation 1 reveals that the power of the second harmonic beam can be increased by affecting other parameters. For example by increasing the length $\Omega$, of the crystal, $P_{2\omega}$ will increase in proportion to $\Omega^2$.

Since $P_{2\omega}$ is inversely proportional to the cross-sectional diameter, $\pi w^2$, of the fundamental beam as it passes through the crystal, to optimize and maximize the second harmonic beam, the beam should be as narrow as possible as it passes through the crystal.

As previously pointed out, equation (1) assumes that there is total transparency of the crystal at both the fundamental and second harmonic wavelengths. The power of the second harmonic beam is proportional to the square of the power of the fundamental beams, $P_{2\omega}$. Any lack of transparency will drastically reduce the power of the second harmonic beam.

Thus in summary the practical considerations involved to optimize the power of the second harmonic beam require that the following four conditions must occur:

1. Transparency of the crystal to the fundamental and second harmonic beams.
2. 90° phase matching.
3. High power at the fundamental frequency.
4. Strong focusing, (i.e., $W_0^2$ small).

The ideal situation, that of 90° phase matching, can, as pointed out above, be achieved in some crystals such as ADP and KDP for some wavelengths. More specifically, in the case of ADP and KDP crystals, second harmonic generation occurs for a fundamental wavelength of 5145 A. so long as the crystal temperature is at approximately −11° C. At this temperature, $\gamma k = 0$, and $\theta = 90°$ in a 45° Z-cut crystal.

Another crystal $Ba_2NaNb_5O_{15}$ (Barium sodium Niobate) provides secondary harmonic wavelengths for a fundamental wavelength of $1.06\mu$, so long as the crystal is maintained at approximately +80° C.

One problem presented by having to maintain the ADP and KDP crystals at −11° C. is that since this temperature is considerably below the dew point, if not otherwise compensated for, moisture in the form of frost, will deposit on the crystal. Any such precipitation on the optically polished surface of the crystal cuts down on the transmission characteristic of the crystal and thereby results in a power loss in second harmonic wave generation. Further since ADP and KDP crystals are quite hygroscopic, rapid destruction of the crystal surfaces occurs when moisture is present.

In order to protect the crystal surfaces prior art devices have used dry nitrogen gas flowing past the crystal surfaces to prevent condensation of moisture and/or frost surfaces from forming on the crystals. However, while this may keep moisture from the crystal, it has an adverse effect on the stability and control of the temperature of the crystal which, as pointed out above, is critical and introduces undesirable temperature gradients across the crystals. Further, it requires a separate supply of gas and bulky gas-handling equipment.

Very little attention has been given in prior art devices to the problem of stabilizing and properly maintaining the temperature of the crystal. Some prior art devices have used thermoelectric coolers working on the Peltier principle, which are thermally linked with the crystal to cool the crystal. However prior art arrangements are open loop; that is, they are set and monitored manually and in general have been poor in operation. Furthermore, as pointed out above, the use of nitrogen gas for preventing moisture formulation introduces another variable which makes manual temperature control undesirable. Poor temperature control means that a 90° phase matching is unlikely and second harmonic beam power will diminish.

As a result of the nonlinear coupling that occurs in the crystal between the fundamental and the second harmonic beams, a characteristic of the second harmonic beam is that the second harmonic beam is orthogonally polarized with respect to that of the fundamental beam. This follows from the fact that the beams are propagating normal (at 90°) to the optic axis of the crystal and that one beam, the fundamental beam, is an ordinary ray but the other, the secondary harmonic, is an extraordinary ray.

The prior art devices which used flowing nitrogen gases for the regions described above, did not encapsulate or otherwise enclose the crystal in a sealed, protected environment. Rather, the stream of nitrogen gas was used to bathe the crystal. Consequently, there was no need to be concerned with losses to the fundamental beam through windows which are by necessity required in a sealed enclosure.

SUMMARY OF THE INVENTION

It is therefore an object of the present invention to provide an improved optical second harmonic generator;

Another object of the present invention is to provide a stable and protective environment for a second harmonic generating crystal;

Another object of the present invention is to accurately control and maintain the crystal temperature in a second harmonic generating device so as to optimize optical second harmonic power generation;

Another object of the present invention is to provide a second harmonic generator which maximizes the optical second harmonic power generated by maximizing the power of the fundamental beam reaching the crystal and minimizing the optical losses throughout the harmonic generator;

Another object of the present invention to provide means for variably controlling the output power of an optical second harmonic generator.

In accordance with the present invention, a second harmonic producing crystal is mounted within an airtight enclosure capsule so that the enclosure can be evacuated to a near-vacuum condition. Thermally connected to the crystal is a suitable heat exchange device such as a thermoelectric cooler, to maintain the crystal at a predetermined temperature. A temperature measuring device thermally secured to the crystal forms a part of a feedback temperature control system for maintaining the temperature of the crystal at the predetermined temperature.

By maintaining the crystal in a vacuum, and maintaining the crystal at a controlled temperature, it is possible to prevent condensation of moisture and the formation of frost which results in a deterioration of the crystal and a loss of transmission of light through the crystal.

In accordance with another aspect of the invention, the enclosure includes an incapsulating cover which is sealingly secured to enclose the crystal. The cover includes two oppositely disposed windows aligned at the ends of the crystal. The first window, through which the incoming fundamental wavelength beam is transmitted, is a Brewser's angle to that beam. The second or output window, aligned at the output end of the crystal is at Brewster's angle to the second harmonic beam leaving the crystal. Consequently, the second window is orthogonally located relative to the first window.

The first Brewster window provides maximum fundamental wavelength power to the crystal. The second window acts to maximize transmission of the resulting secondary harmonic beam.

A temperature-measuring device such as a thermistor, is thermally connected with the crystal to form a part of a control circuit, as for example a resistance bridge circuit, for maintaining the temperature of the crystal constant, at the proper value.

A second temperature sensing device, which may also be a thermistor and is also thermally connected with the crystal, can be used for continuously monitoring the temperature of the crystal.

Since the crystal is kept in a vacuum environment, there is no possibility of moisture condensation or frost. Also, unlike prior art devices using nitrogen gas, it is not necessary to worry about the coolant affecting the crystal temperature, and therefore the vacuum arrangement is far more satisfactory than prior art devices in maintaining stability and accuracy of the temperature of the crystal.

DESCRIPTION OF THE PREFERRED EMBODIMENTS

Figure 1:
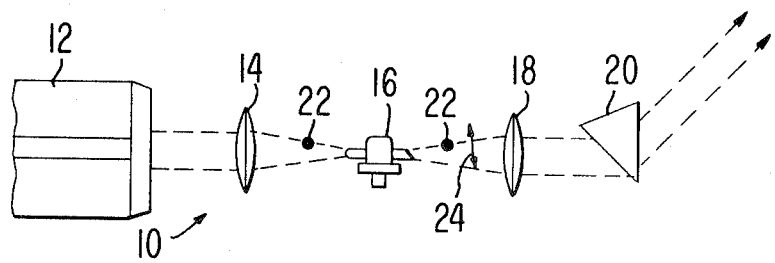
FIG. 1 shows a block diagram of a laser system incorporating the improved optical second harmonic generator in accordance with the present invention.

FIG. 1 illustrates a laser system 10 for providing optical second harmonic beams of light. A laser 12 provides light through a first lens 14. Lens 14 focuses and concentrates the beam through the crystal (FIG. 2) within the second harmonic generator 16. This lens focuses the beam to a small cross section in accordance with equation (1) above such that the cross section is optimally minimized at the point that it goes through the crystal. The second harmonic generator 16 converts the fundamental beam provided by laser 12 into a beam of light, a part of which includes the second harmonic wavelength beam. This resulting beam then passes through a second lens 18 which recollimates the output light beam. A prism 20 or other separator can be used to separate the second harmonic beam from the fundamental beam.

In one specific embodiment, for example, laser 12 is an argon ion laser providing a fundamental beam of light having a wavelength of 5145 A. It will be noted by the dot 22 that the fundamental beam is shown entering the second harmonic generator 16 polarized in a direction normal to the paper. When the beam passes through the second harmonic generator 16, the second harmonic beam at 2563 A., is produced. As noted above, the resulting beam from the second harmonic generator 16 includes a fundamental portion. The second harmonic beam is polarized orthogonally, i.e., 90° relative to the fundamental beam.

Lens 14 is coated with antireflection material on both sides thereof (not shown) which is suitable for maximizing the passage of the particular fundamental wavelength provided by laser 12, i.e., 5,145 A from an argon ion laser. Furthermore, lens 14 has a 10 cm. focal length, for a wavelength 5145 A., which concentrates the beam exactly at the point within the second harmonic generator 16 in which the crystal is located. Consequently if a different fundamental wavelength is used a different lens 14 should be used which will have maximum transmission at the desired wavelengths and can also have a focal length for the fundamental wavelength used.

Similarly, the lens 18 is provided with antireflection surfaces for optimally passing the second harmonic wavelength, 2573 A. in the case of a 5145 A. fundamental wavelength.

Figure 2:
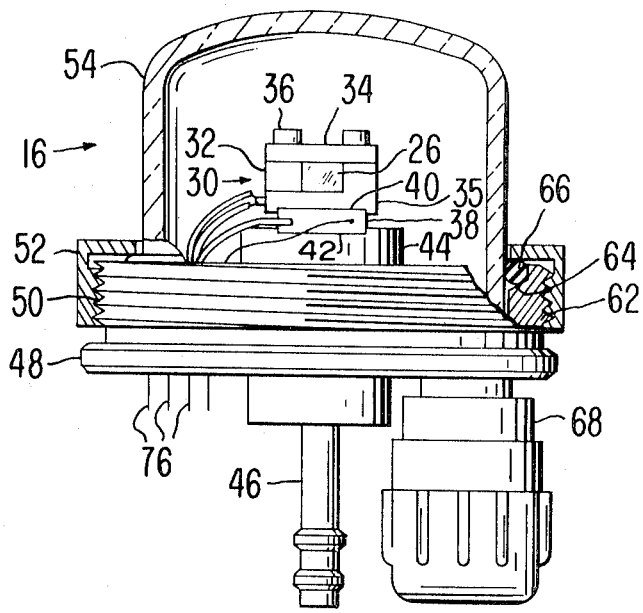
FIG. 2 is a cross-sectional elevation view of an optical ultraviolet generator shown in FIG. 1.
Figure 3:
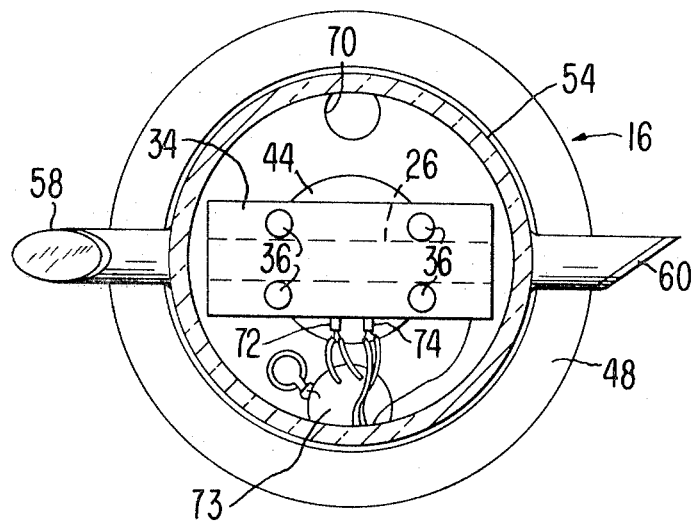
FIG. 3 is a top view of the second harmonic generator of FIG. 2.

Referring now to FIGS. 2 and 3 which show the improved second harmonic generator 16 in accordance with the present invention. A nonlinear crystal 26 such as ADP or KDP is mounted within a crystal housing 30 comprising a clamp bar 32, clamp plate 34, body portion heat sink 35, and screws 36 for securing the housing 30 together. It has been found that aluminum is an excellent material from which to make the various parts of the housing 30. The housing 30 is secured to a thermoelectric device 38, by any suitable means such as an epoxy bond. The thermoelectric cooler 38, which maintains the temperature of the crystal 26 at a predetermined temperature such as −11° C. in the case of ADP or KDP, makes use of the well-known Peltier effect. Thus one side 40 of cooler 38 is maintained at a low temperature, and the other side 42 at close to ambient temperature.

It should be mentioned however, in the case of other crystals, the desired temperature may be higher or lower than the −11° C. for ADP and KDP.

The bottom side 42 of the thermoelectric device 38 is mounted upon a heat sink 44. The heat sink 44 includes therein passageways (not shown) through the "hot" side of thermoelectric device 38 for the passage of a suitable coolant, such as water, to remove generated heat therein. The coolant is provided through a nozzle 46 which includes an inlet and an outlet passageway.

The crystal housing 30, thermoelectric device 38, and heat sink 44 are mounted upon a base assembly 48 which includes circumferentially threaded portion 50. The threaded portion 50 is adaptable for receiving a retaining ring 52 which screws upon the base 48 in a manner which will be described subsequently.

The crystal 26 is incapsulated by a cover 54 which may be made of any suitable material, but desirably is of glass.

As may best be seen by reference to FIG. 3, provided on opposite sides of cover 54 are first and second windows 58 and 60 respectively aligned along the optical axis of crystal 26. Window 58 is at Brewster's angle relative to the incoming beam so as to maximize the power transmission therethrough of the fundamental beam. In accordance with the present invention, the second window 60, through which the resulting secondary harmonic beam is emitted, is located orthogonally relative to the first Brewster window 58.

This arrangement of the window 58 and 60 gives great advantage over prior art devices. First, the first Brewster window 58 maximizes the power transmitted to the crystal 26 and therefore maximizes second harmonic generation since, as previously pointed out, the second harmonic beam is proportional to the square of the power of the fundamental beam.

Secondly, since it is known that the second harmonic beam is polarized at an angle 90° relative to the fundamental beam, the window 60, being orthogonal to the window 58, acts to transmit a maximum amount of the second harmonic beam which is generated. Note that window 58 also tends to eliminate part of the fundamental beam which remains after passing through the crystal 26. This, however, is beneficial since the second harmonic beam is the desired beam.

Crystal 26 is approximately 5 centimeters long in the second harmonic generator presently being manufactured. The longer the crystal 26, the greater the resulting second harmonic beam, because of the relationship of the length in equation (1). However, as a practical matter, once the length of the crystal 26 reaches a certain length, the additional expense in obtaining a longer crystal is not justified.

Also, note that the crystal 26 must have a proper orientation in order to obtain the second harmonic beam. Thus in the case of a KDP or ADP crystal, the crystal is a 45° Z-cut crystal oriented with the optic axis of the crystal normal to the direction of propagation of the beams and to the polarization of the fundamental beam. Consequently, the fundamental beam propagates through the crystal as an ordinary wave, and induces the harmonic beam at twice the frequency which is colinear with the fundamental i.e., along the same axis. As noted, the second harmonic beam is polarized 90° relative to the fundamental beam.

The crystal 26 is incapsulated so as to be kept in a vacuum environment. To accomplish this, the base 48 includes a rim portion 62 which extends around the circumference of the base. The rim portion 62 includes a beveled edge 64 extending around the interior circumference as shown.

An O-ring 66, made of a suitable resilient material, is placed along the beveled portion 64 of the rim 62. The cover 54 with retaining ring 52 therearound is put in place and the retaining ring 66 screwed on the base 50 forcing the O-ring 66 downward and, as a result of the beveled portion 64, against the cover 54. This provides an excellent airtight seal so as to permit evacuation of the air surrounding the crystal 26.

A vacuum is effected by withdrawing air through the nozzle 68 (FIG. 2) which is coupled through a hole 70 (FIG. 3) to the area within the cover 54.

Connected to the housing 30 are two thermistors or analogous heat sensing devices 72 and 74. Each of these thermistors is connected by a pair of wires to a socket 73, which provides externally mounted plugs 76, (FIG. 2). Thermistor 72 is used as a temperature measuring device in a control system for maintaining the temperature of the crystal at a predetermined value, such as −11° C. in the case of ADP and KDP. Details of the control system may be seen by reference to FIG. 5.

A second thermistor 74 is also connected in a thermal relationship with the housing 30. This thermistor may be used in connection with a calibrated ohmmeter for permitting manual observation and monitoring of the temperature of the crystal 26.

Figures 4, 5:
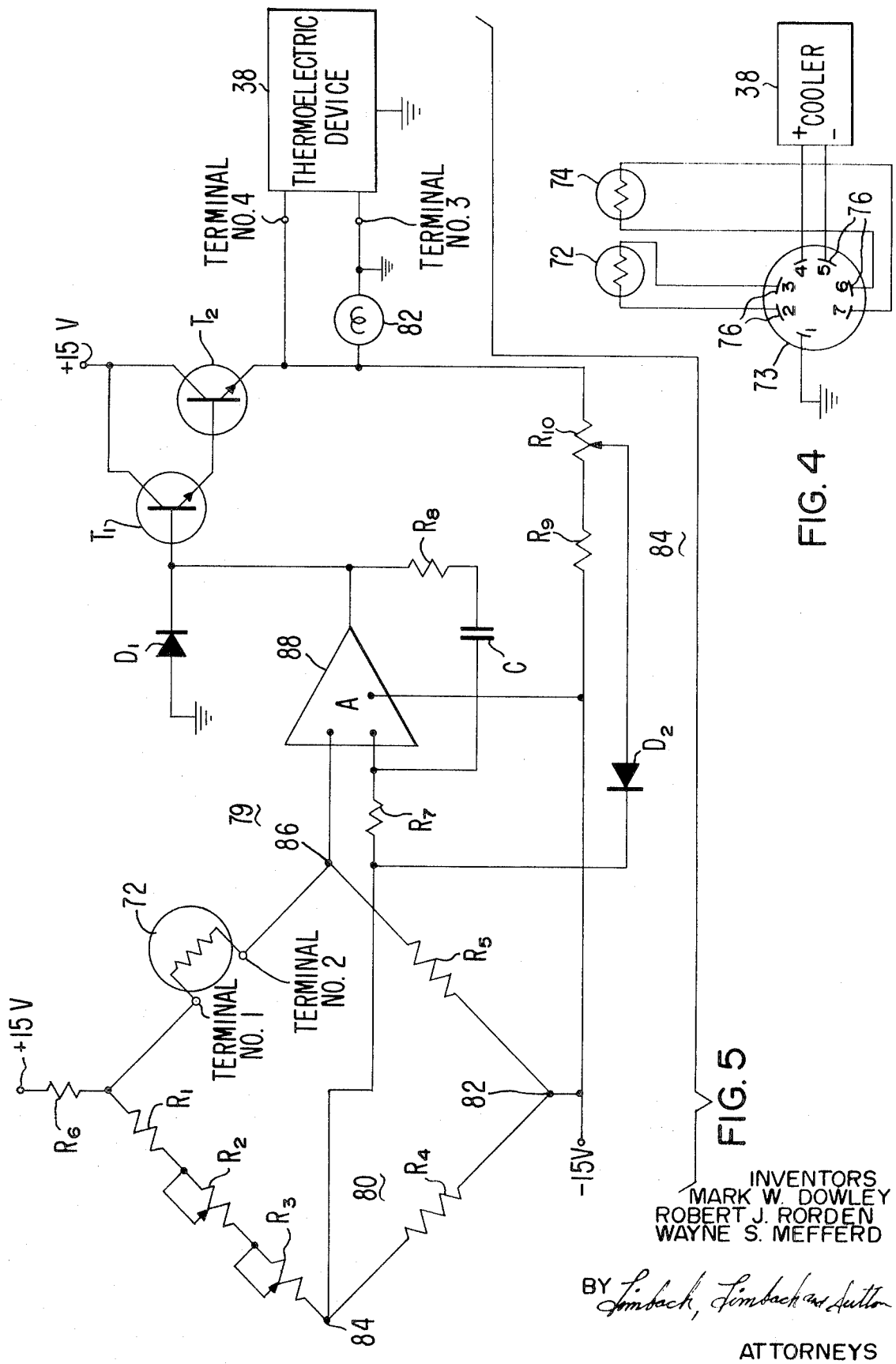
FIG. 4 is a schematic diagram of the wiring of the second harmonic generator of FIG. 1.
FIG. 5 is a schematic diagram of the feedback control system used to maintain the crystal of FIG. 1 at a predetermined control temperature, and for controlling the strength of the second harmonic beam.

Details of the wiring of the thermistor 72 and 74 and of the socket 73 may be seen by reference to FIG. 4. The thermoelectric device 38 is also connected with the external plug 76 as shown.

FIG. 5 illustrates a control system 79 utilizing thermistor 72 for maintaining the crystal at the precise predetermined temperature. Thermistor 72 forms one branch or leg of a resistance bridge circuit 80. The thermistor is connected with the bridge circuit by means of the external plugs 76; and in particular to terminals No. 1 and No. 2 of socket 73 (FIG. 4). The second branch of the bridge circuit 80 includes resistor $R_1$ and variable resistors $R_2$ and $R_3$. The third and fourth branches of the bridge comprise resistors $R_4$ and $R_5$ respectively. A positive 15 volts is applied to the bridge 80 through a resistor $R_6$ and a negative 15 volts is applied to the bridge at 82.

Connected between the points 84 and 86 and through resistor $R_4$ is an operational amplifier 88, which includes a feedback loop comprising a capacitor C and resistor $R_8$. The output of amplifier 88 is fed through a cascaded pair of amplifying transistors $T_1$ and $T_2$. Diode $D_1$ is provided between the base of transistor $T_1$ and ground to insure that the base voltage of $T_1$ is maintained above ground potential.

The output from the emitter of transistor $T_2$ is connected with terminal No. 4 of the thermoelectric device 38. It is also connected with lamp 82 to provide a visual indication of whether or not the device 38 is "on".

As is well know, the resistance of the thermistor 72 is dependent upon the temperature of the thermistor. That is, the resistance of thermistor 72 is inversely proportional to its temperature.

At the desired temperature of the crystal, i.e., $-11°$ C. for ADP, the bridge circuit 80 can be balanced so that the voltage across the terminals 84–86 is substantially zero. This may be accomplished by manually adjusting the coarse adjustment variable resistor $R_3$ and/or the fine adjustment variable resistor $R_2$ and then observing the peak of the second harmonic power.

Once the bridge circuit 80 is set the temperature of the crystal will automatically be maintained. If the temperature of the crystal should vary from the predetermined temperature, the resistance of thermistor 72 changes accordingly and the bridge 80 becomes unbalanced and a voltage appears across terminals 84 and 86, which from the input terminals to amplifier 88. The amplifier 88 and transistors $T_1$ and $T_2$ are arranged to provide additional or less current to the thermoelectric device 38 depending upon whether the temperature of the crystal has increased or decreased respectively. That is, the feedback arrangement of thermistor 72 is such as to bring the bridge circuit 80 back into balance when the temperature strays. Resistors $R_9$, $R_{10}$ and diode $D_2$ provide current limiting for the thermoelectric device 38.

As noted above the output power of the second harmonic beam is very much dependent upon the temperature of the crystal. This fact has been utilized in the present invention to vary the power of the second harmonic output beam. This is done by adjusting the variable resistors $R_1$ and $R_2$ to thereby modify the steady state temperature of the crystal. The output power level of the second harmonic beam is reduced accordingly.

While the above control circuit 79 has been described in sufficient detail so as to enable one skilled in the art to make and use the invention, the following circuit element values are herein given to further illustrate one operative device:

| | |
|---|---|
| Thermistor 72 | 10 K-ohm (room temperature) |
| R | 4.53 K-ohms |
| $R_1$ | 50 ohms |
| $R_2$ | 1.0 K-ohm |
| $R_3$ | 100 K-ohms |
| $R_4$ | 10 K-ohms |
| $R_5$ | 5.49 K-ohm |
| $R_6$ | 1.0 M-ohm |
| $R_7$ | 10 M-ohm |
| $R_8$ | 1.0 K-ohm |
| $R_{10}$ | 1.0 K-ohm |
| $D_1$ & $D_2$ | 1N457 |
| $T_1$ | 2N1711 |
| $T_2$ | 2N3055 |
| Operational Amplifier 81 | ADO—29 |
| C | 1.0 mf. |

It should be noted that optical harmonic generation herein described is, as shown in FIG. 1, suitable for use external of a laser. However, the present invention should not be so limited. Thus, the general principles of the present invention may be used in an optical harmonic generator within a laser resonator cavity. In such a case the windows 58 and 60 would be eliminated entirely to reduce optical losses.

While certain specific embodiments of the invention have been illustrated and described in detail herein, it will be apparent from the variety of mechanisms disclosed that many different specific forms of apparatus may be employed within the scope of the following claims.

We claim:

1. Optical second harmonic generator for use with a laser or maser comprising:
   a. a crystal capable of producing radiation of a second harmonic wavelength in response to a beam of radiation at a fundamental wavelength;
   b. means for mounting said crystal;
   c. means for maintaining said crystal at a predetermined temperature;
   d. means for encapsulating said crystal within a substantially airtight enclosure adaptable to maintain said crystal in a substantially vacuum environment; and
   e. wherein said encapsulating means includes as an integral part thereof a first window in alignment with the axis of said crystal at Brewster's angle to incoming beams of radiation, and a second window oriented substantially orthogonally with respect to said first window and in axial alignment with the axis of said crystal and at Brewster's angle to the resulting second harmonic wavelength beam which results.

2. Optical second harmonic generator as in claim 1 wherein said temperature maintaining means comprises:
   i. a thermoelectric heat exchange device in a heat conducting relationship with said crystal;
   ii. a heat sink in a heat conducting relationship with said thermoelectric heat exchange device; and
   iii. circuit means responsive to the temperature of said crystal for maintaining said crystal at said predetermined temperature by regulating said thermoelectric heat exchange device.

3. Optical second harmonic generator as in claim 2 wherein said circuit means includes first means in thermal contact with said crystal and responsive to the temperature of said crystal for providing a temperature-related electrical signal.

4. Optical second harmonic generator as in claim 3 including second means for monitoring the temperature of said crystal.

5. Optical second harmonic generator as in claim 4 wherein said first and second means each comprise thermistors thermally in contact with said crystal.

6. Optical second harmonic generator as in claim 3 wherein said heat sink includes a cooling chamber therein and an inlet and outlet of passage of a coolant therethrough.

7. Optical second harmonic generator as in claim 1 including a sealable vacuum nozzle connected to said airtight enclosure.

8. Second harmonic generator as in claim 2 wherein said crystal mounting means comprises an aluminum housing mounted to said thermoelectric device and enclosing said crystal.

9. Second harmonic generator as in claim 1 wherein said crystal is of $NH_4H_2PO_4$ and said predetermined temperature is approximately $-11°$ C.

10. Second harmonic generator as in claim 1 wherein said crystal is of $KH_2PO_4$ and said predetermined temperature is approximately $-11°$ C.

11. Second harmonic generator as in claim 1 including first optical means for reducing the cross-sectional area of said fundamental wavelength radiation upon passing through said crystal and second optical means for recollimating said resulting second harmonic radiation.

12. Second harmonic generator as in claim 11 wherein each of said first and second optical means comprises convex lenses.

13. Second harmonic generator as in claim 1 wherein said encapsulating means comprises
   a. a base member;

b. a cover including as a portion thereof said first and second windows; and c. means for sealingly securing said cover to said base.

14. Second harmonic generator as in claim 13 wherein said base member is circular and includes a circumferentially located beveled-rim portion; and wherein said securing means includes an O-ring receivable within said beveled-rim portion of said base member; and a threaded retaining ring adaptable with said threaded base for forcibly securing said O-ring in an airtight relationship with said cover.

15. Optical second harmonic generator as in claim 3 wherein said circuit means comprises a resistance bridge circuit including in one branch thereof said first means, and amplifying means for regulating said thermoelectric heat exchange device in response to bridge imbalances caused by variations in said electrical signals.

16. Optical second harmonic generator as in claim 15 wherein said amplifying means comprises an operational amplifier coupled with at least one transistor operating in the amplifying mode.

17. Optical second harmonic generator as in claim 15 including at least one variable resistor in another branch of said bridge circuit for selectively adjusting said predetermined temperature.

18. Optical second harmonic generator as in claim 17 including current limiting means for said thermoelectric heat exchange device.

19. Optical second harmonic generator as in claim 15 wherein said first means comprises a thermistor; wherein said heat sink includes a cooling chamber therein and an inlet and outlet for passage of a coolant therethrough; wherein said crystal is of $NH_4H_2PO_4$ and said predetermined temperature is approximately $-11°$ C.; and wherein said encapsulating means comprises a base member; a cover including as a portion thereof said first and second windows; and means for sealingly securing said cover to said base; and including first optical means for limiting the cross-sectional area of said fundamental wavelength radiation upon passing through said crystal and second optical means for recollimating said resulting second harmonic radiation and including a sealable vacuum nozzle connected to said airtight enclosure.

* * * * *